(12) United States Patent
Funahashi

(10) Patent No.: US 11,491,910 B2
(45) Date of Patent: Nov. 8, 2022

(54) VEHICLE

(71) Applicants: TOYOTA JIDOSHA KABUSHIKI KAISHA, Toyota (JP); SUBARU CORPORATION, Tokyo (JP)

(72) Inventor: Yoshiki Funahashi, Kariya (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/365,475

(22) Filed: Jul. 1, 2021

(65) Prior Publication Data

US 2022/0080881 A1 Mar. 17, 2022

(30) Foreign Application Priority Data

Sep. 16, 2020 (JP) .............................. JP2020-155802

(51) Int. Cl.
*B60Q 1/26* (2006.01)
*B60Q 1/44* (2006.01)

(52) U.S. Cl.
CPC ............. *B60Q 1/2653* (2013.01); *B60Q 1/44* (2013.01)

(58) Field of Classification Search
None
See application file for complete search history.

(56) References Cited

U.S. PATENT DOCUMENTS

2019/0299887 A1* 10/2019 Sudo ....................... B60R 16/06

FOREIGN PATENT DOCUMENTS

| JP | 07-052709 A | 2/1995 |
| JP | 2013-199187 A | 10/2013 |

* cited by examiner

*Primary Examiner* — Ashok Patel
(74) *Attorney, Agent, or Firm* — Oliff PLC

(57) ABSTRACT

A vehicle includes a back door glass, a high mount stop lamp provided in front of the back door glass facing the back door glass in a front-rear direction of the vehicle, an interior panel provided below the high mount stop lamp and configured to extend along the front-rear direction of the vehicle, and a seal member. The high mount stop lamp includes a lamp base and an extension portion configured to extend from the lamp base toward the back door glass at a rear of the vehicle in the front-rear direction of the vehicle. The seal member is configured to seal a space between the back door glass and the extension portion.

6 Claims, 4 Drawing Sheets

VEHICLE

CROSS-REFERENCE TO RELATED APPLICATION

This application claims priority to Japanese Patent Application No. 2020-155802 filed on Sep. 16, 2020, incorporated herein by reference in its entirety.

BACKGROUND

1. Technical Field

The techniques disclosed in the present specification relate to a vehicle.

2. Description of Related Art

Japanese Unexamined Patent Application Publication No. 2013-199187 (JP 2013-199187 A) discloses a vehicle including a rear window is configured of a back-up light glass extending in an inclined direction with respect to the vertical direction and an extra glass extending in a substantially vertical direction.

SUMMARY

A high mount stop lamp may be provided at the upper end part of the rear window of the rear portion of the vehicle (hereinafter referred to as "back door glass") to notify the following vehicle of the braking of the own vehicle. When such a high mount stop lamp is attached to a vehicle disclosed in JP 2013-199187 A, there is a possibility that the light emitted from the high mount stop lamp is reflected by the back door glass and guided downward, and leaks into the vehicle cabin. The present specification provides a technique that restrains the light emitted from the high mount stop lamp from leaking into the vehicle cabin.

An aspect of the disclosure disclosed in the present specification relate to a vehicle. The vehicle includes a back door glass, a high mount stop lamp, an interior panel, a seal member. The high mount stop lamp provided in front of the back door glass facing the back door glass in a front-rear direction of the vehicle. The interior panel provided below the high mount stop lamp and configured to extend along the front-rear direction of the vehicle. The high mount stop lamp includes a lamp base and an extension portion configured to extend from the lamp base toward the back door glass at a rear of the vehicle. The seal member is configured to seal a space between the back door glass and the extension portion.

In the vehicle, a high mount stop lamp (hereinafter, simply referred to as "lamp") is provided in front of the back door glass in the front-rear direction of the vehicle. An interior panel is provided below the lamp, and in above the interior panel, the space between the back door glass and the extension portion of the lamp is configured to be sealed by a seal member. Therefore, even in the case of a gap between the back door glass and the interior panel exists, the seal member that seals the space between the back door glass and the lamp (specifically, an extension portion) restrains the light emitted from the lamp from penetrating the gap. Therefore, restraining the light emitted from the lamp from leaking into the vehicle cabin is possible.

In the aspect, the seal member may have a cylindrical seal portion and a notch may be formed in an inner side of the seal portion.

According to the aspect, when the seal portion is pressed by the back door glass and the extension portion of the lamp, the seal portion is easily deformed so as to follow the curvature change of the back door glass. Therefore, the space between the extension portion and the back door glass can be preferably sealed.

In the aspect, the seal member may be provided along a peripheral edge of the extension portion.

According to the aspect, the area where the light emitted from the lamp can leak can be easily sealed, and a member for attaching the seal member is no need to be provided separately.

In the aspect, the seal member may have a cylindrical seal portion and the seal portion may be configured such that a notch is formed in an inner side of the seal portion.

In the aspect, the seal member may be provided along the peripheral edge of the extension portion.

In the aspect, a wall extending in the front-rear direction of the vehicle along the back door glass may be configured to erect at a left end and a right end of the extension portion, respectively, and an upper end of the wall may be configured to extend parallel to an inclination direction of the back door glass.

In the aspect, the seal member may be configured to extend in a fin shape or the seal member may be configured to seal the space between the back door glass and the extension portion.

In the aspect, the seal member may have a cylindrical seal portion and a plurality of insertion portions protruding from the seal portion radially outward of the seal portion, and the seal member may be attached to the extension portion by inserting each of the insertion portions into a plurality of through-holes formed in the extension portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
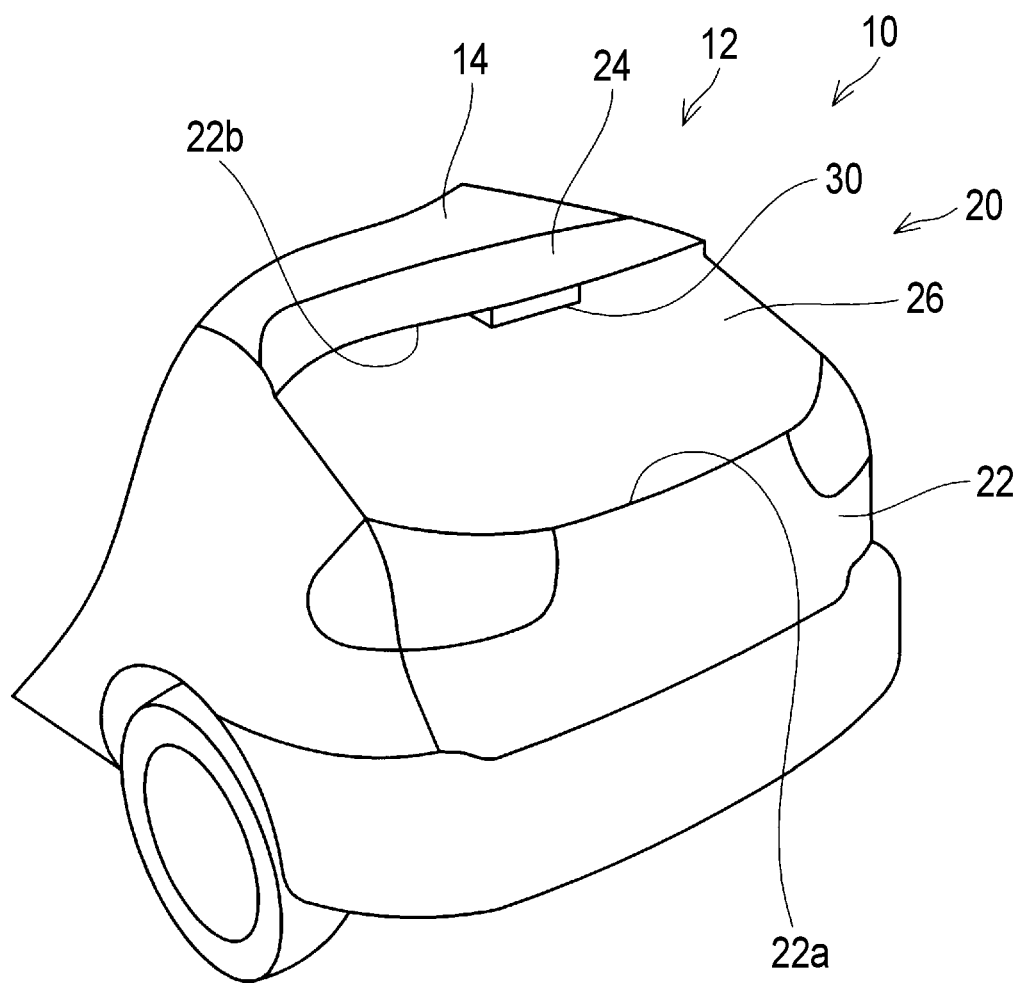
FIG. 1 is a diagram showing a rear structure of a vehicle according to an embodiment.
Figure 1:
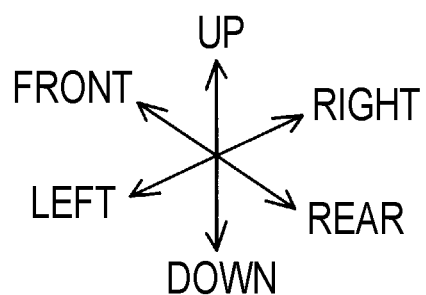

A vehicle 10 of the embodiment will be described with reference to the drawings. As shown in FIG. 1, the vehicle 10 includes a vehicle body 12 and a high mount stop lamp 30 (hereinafter, referred to as "lamp 30"). The vehicle body 12 includes a roof panel 14 that configures a ceiling, and a back door 20 provided at the rear end of the vehicle body 12 in the rearward of the roof panel 14. The lamp 30 is a lamp that emits light toward the rearward of the vehicle 10 together with a pair of brake lamps. The lamp 30 is provided above the brake lamps. Accordingly, the lamp 30 can be visually recognized even in a situation where the brake lamp cannot be visually recognized from the rearward of the vehicle 10.

The back door 20 is attached to the framework of the vehicle body 12 so as to be swingable in the vertical direction via a hinge (not shown). The rear portion of the vehicle body 12 is opened and closed as the back door 20 swings. The back door 20 includes a back door panel 22, an exterior panel 24, a back door glass 26, and an interior panel 28 (refer to FIG. 2).

The back door panel 22 has an opening 22a. The back door glass 26 is attached to the opening 22a. The back door glass 26 is attached to the opening 22a of the back door panel 22 by, for example, an adhesive.

The exterior panel 24 is attached to an outer side of the back door panel 22. The exterior panel 24 is provided between an upper edge 22b of the opening 22a of the back door panel 22 and the roof panel 14. As a modified example, the exterior panel 24 may be provided with a step, and a spoiler may be attached to the step.

Figure 2:
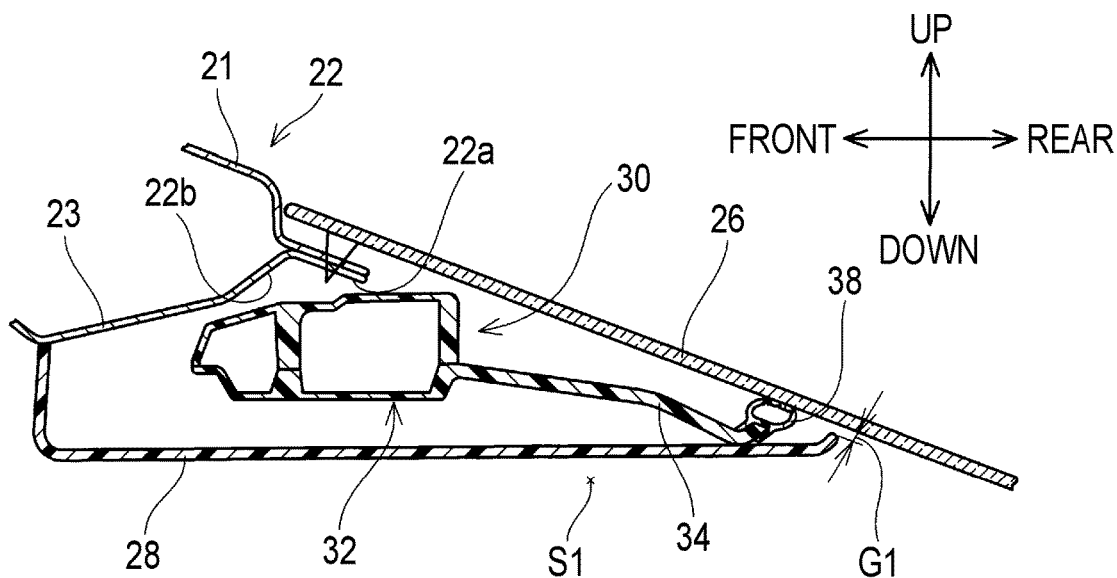
FIG. 2 is an end view showing a lamp and a member provided in the vicinity thereof according to the embodiment.

As shown in FIG. 2, the back door panel 22 is formed by superimposing two plate members 21, 23. As a result, the rigidity of the back door panel 22 is enhanced. Hereinafter, of the two plate members that configure the back door panel 22, the outer plate member is referred to as an "outer panel 21", and the inner plate member is referred to as an "inner panel 23". In FIG. 2, the exterior panel 24 is not shown.

The lamp 30 is provided in front of the vehicle 10 of the back door glass 26. The lamp 30 is attached to the upper edge 22b of the opening 22a of the back door panel 22. The lamp 30 emits light toward the back door glass 26 in the rearward of the vehicle 10. The light emitted from the lamp 30 passes through the back door glass 26 and the light is emitted toward the rearward of the vehicle 10.

The interior panel 28 is provided below the lamp 30. The interior panel 28 is attached to the inner panel 23 via, for example, a pin. The interior panel 28 extends from the inner panel 23 toward the back door glass 26. That is, the interior panel 28 extends along the front-rear direction of the vehicle 10. The lamp 30 is covered from below by the interior panel 28.

Figure 3:
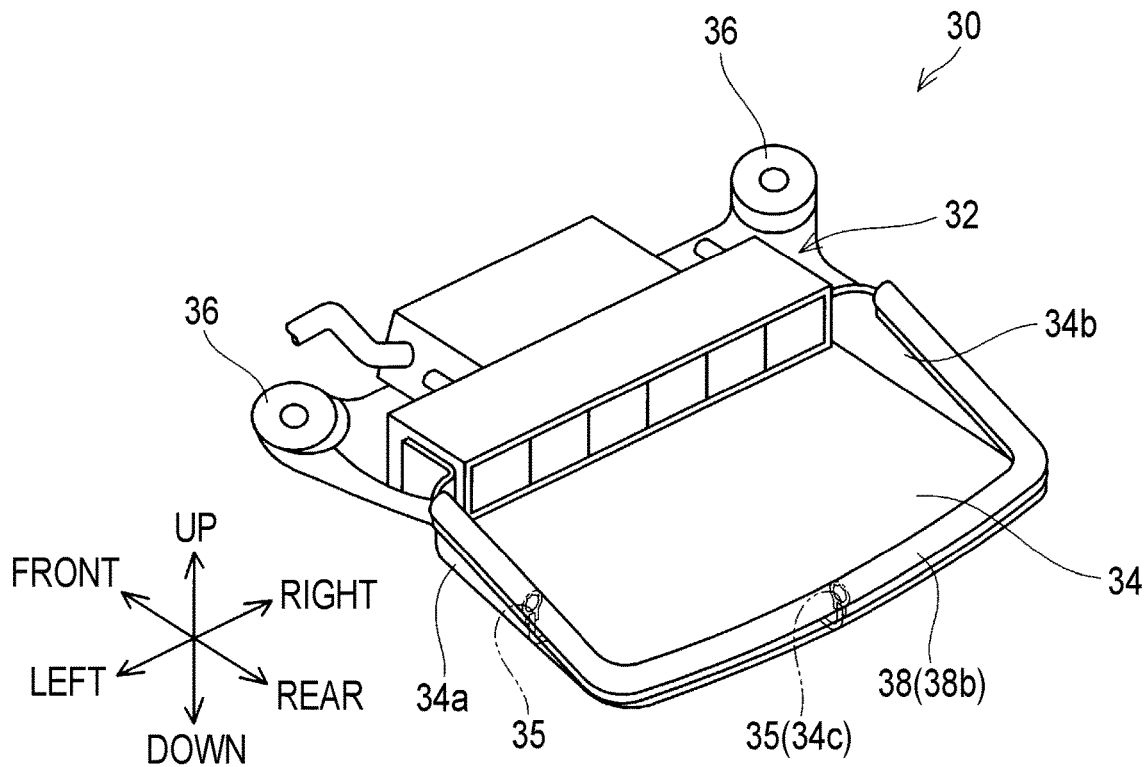
FIG. 3 is a perspective view of a lamp.

Next, the configuration of the lamp 30 will be described with reference to FIGS. 2 and 3. As shown in FIGS. 2 and 3, the lamp 30 includes a lamp base 32, an extension portion 34, and two vehicle body attachment portions 36. A light emitting unit (not shown) that emits light is provided inside the lamp base 32. The light emitting unit includes, for example, a plurality of high-brightness LEDs. The light emitting unit is connected to the power supply of the vehicle 10 via a cable (not shown), and emits light when the driver operates the brake. In FIG. 2, the illustration of the internal structure of the lamp 30 is omitted.

The extension portion 34 has a tapered plate member having length in the right and left direction gradually decreases from the end portion on the rear side toward the front side of the vehicle. As shown in FIGS. 2 and 3, the extension portion 34 extends obliquely downward from the rear end of the lamp base 32 toward the back door glass 26 in the rearward of the vehicle 10. As shown in FIG. 3, walls 34a, 34b extending in the front-rear direction along the back door glass 26 are erected at the left end and the right end of the extension portion 34, respectively. The upper ends of the walls 34a, 34b extend substantially parallel to the inclination direction of the back door glass 26.

The two vehicle body attachment portions 36 are provided in the vehicle front-rear direction with the lamp base 32 interposed with respect to the extension portion 34. The lamp 30 is attached to the back door panel 22 in the two vehicle body attachment portions 36. Regarding the two vehicle body attachment portions 36, one vehicle body attachment portion 36 is provided at one of the right and left ends on the front side of the lamp 30, and the other vehicle body attachment portion 36 is provided at the other of the right and left ends on the front side of the lamp 30. However, the number of the vehicle body attachment portions 36 of the lamp 30 is not limited to two, and may be three or more.

Figure 4:
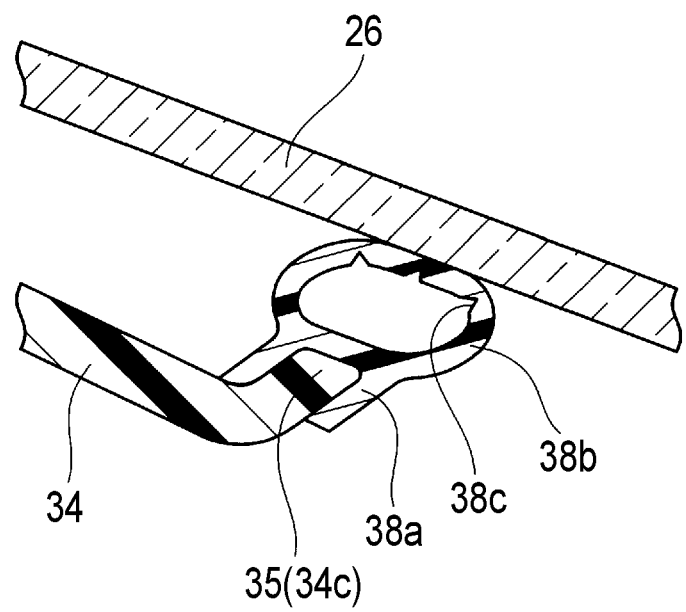
FIG. 4 is an enlarged view of the vicinity of the seal member of FIG. 2.

As shown in FIGS. 2 to 4, a seal member 38 is attached to the extension portion 34 of the lamp 30. The seal member 38 is formed by, for example, a resin, such as rubber, elastomer, or nylon. As shown in FIG. 4, the seal member 38 has an engaging portion 38a and a seal portion 38b.

The engaging portion 38a has a shape corresponding to the outer diameter of the peripheral edge 35 of the extension portion 34, and the engaging portion 38a is engaged with the peripheral edge 35 of the extension portion 34. Specifically, as shown in FIG. 3, the engaging portion 38a is attached in a range extending from the upper end of the wall 34a of the extension portion 34 to the upper end of the wall 34b via the rear end 34c of the extension portion 34. That is, the seal member 38 is provided so as to surround the extension portion 34. The engaging portion 38a may be more firmly fixed to the extension portion 34 by using an adhesive, double-sided tape, or the like. In FIG. 3, partial cross sections of the extension portion 34 and the seal member 38 are shown by two-dot chain lines.

The seal portion 38b has a cylindrical shape. As shown in FIG. 4, a plurality of notches 38c is formed in an inner side of the seal portion 38b. Each notch 38c extends along the seal direction in an inner side of the seal portion 38b. In the present embodiment, three notches 38c are formed in a range located on the back door glass 26 side in an inner side of the seal portion 38b. The seal member 38 seals the space between the extension portion 34 and the back door glass 26 by being attached to the extension portion 34. Accordingly, the light emitted from the lamp 30 is restrained from diffusing in a direction other than the rearward of the vehicle 10.

In the present embodiment, as shown in FIG. 2, a gap G1 is formed between the interior panel 28 and the back door glass 26. Therefore, the light emitted from the lamp 30 can penetrate the space S1 in the vehicle cabin through the gap G1. In particular, in the present embodiment, the back door glass 26 is greatly inclined with respect to the vertical direction. Therefore, since a part of the light emitted from the lamp 30 is reflected by the back door glass 26 and guided downward, the light easily penetrates the space S1. However, in the present embodiment, since the seal member 38 is provided between the back door glass 26 and the extension portion 34, the seal member 38 restrains light from penetrating the gap G1. Therefore, the light emitted from the lamp 30 is restrained from leaking into the vehicle cabin.

Further, in the present embodiment, the notches 38c are formed in an inner side of the seal portion 38b. Therefore, when the seal portion 38b is pressed by the back door glass 26 and the extension portion 34 of the lamp 30, the seal portion 38b is easily deformed so as to follow the curvature change of the back door glass 26. Therefore, the space between the back door glass 26 and the extension portion 34 can be preferably sealed.

Further, in the present embodiment, the seal member 38 is attached along the peripheral edge 35 of the extension portion 34 (that is, the seal member 38 is attached across the upper end of the wall 34a, the rear end 34c of the extension portion 34, and the upper end of the wall 34b). Therefore, the area where the light emitted from the lamp 30 can leak can be easily sealed, and a member for attaching the seal member 38 is no need to be provided separately.

Figure 5:
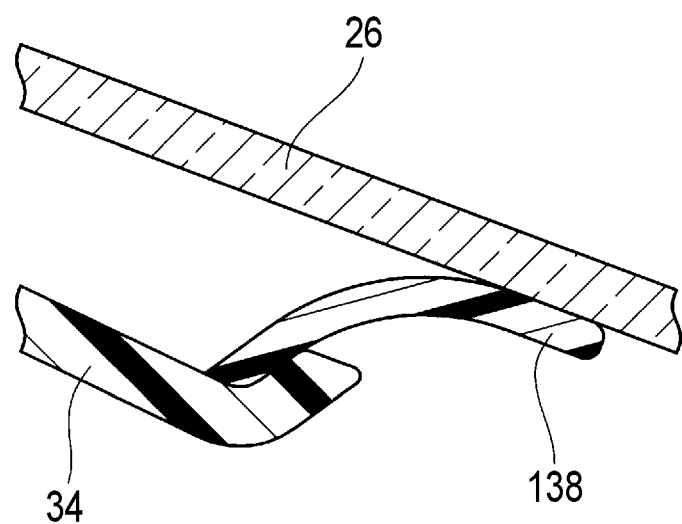
FIG. 5 is an end view showing a seal member according to a modified example.
Figure 6:
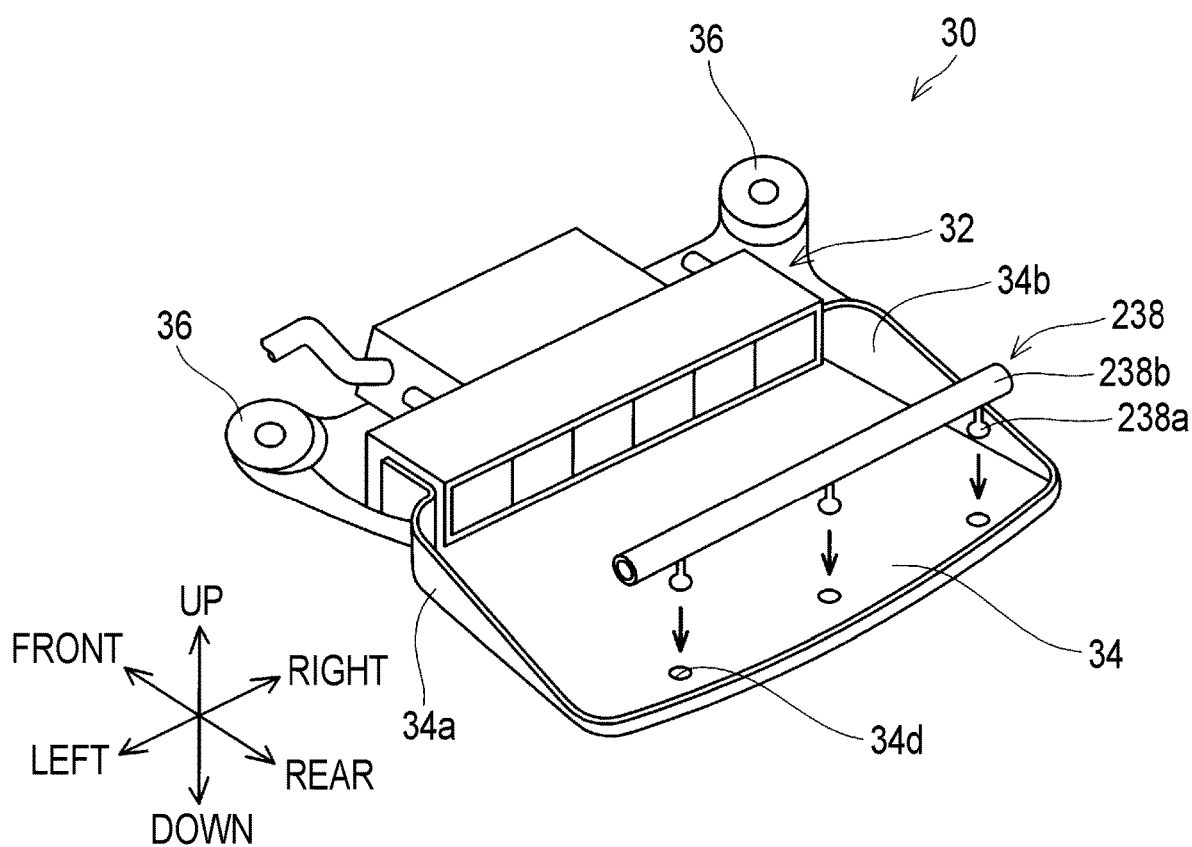
FIG. 6 is a perspective view showing a seal member according to another modified example.

In the embodiment, the space between the back door glass 26 and the extension portion 34 is sealed by the seal member 38 having a cylindrical shape. However, the shape of the seal member is not particularly limited, for example, as shown in FIG. 5, the seal member 138 extending in a fin shape may seal the space between the back door glass 26 and the extension portion 34. In this case, the seal member 138 may be fixed to the extension portion 34 with an adhesive or the like. Further, the mode in which the seal member is attached to the extension portion 34 is not particularly limited. For example, as shown in FIG. 6, a seal member 238 having a cylindrical seal portion 238b and a plurality of insertion portions 238a protruding from the seal portion 238b radially outward of the seal portion 238b may be used. In this case, the seal member 238 can be attached to the extension portion 34 by inserting each insertion portion 238a into a plurality of through-holes 34d formed in the extension portion 34.

Although specific examples of the techniques disclosed in the present specification have been described in detail, and these are merely examples and do not limit the scope of claims. The techniques described in the claims include various deformations and modifications of the specific examples illustrated above. The technical elements exemplified in the present specification or the drawings exhibit technical usefulness alone or in various combinations, and the technical elements are not limited to the combinations described in the claims at the time of filing. The techniques exemplified in the present specification or the drawings can achieve a plurality of objectives at the same time, and achieving one of the objectives itself has technical usefulness.

What is claimed is:

1. A vehicle comprising:
a back door glass;
a high mount stop lamp provided in front of the back door glass facing the back door glass in a front-rear direction of the vehicle;
an interior panel provided below the high mount stop lamp and configured to extend along the front-rear direction of the vehicle; and
a seal member, wherein:
the high mount stop lamp includes
a lamp base, and
an extension portion configured to extend from the lamp base toward the back door glass at a rear of the vehicle in the front-rear direction of the vehicle; and
the seal member is configured to seal a space between the back door glass and the extension portion.

2. The vehicle according to claim 1, wherein:
the seal member has a cylindrical seal portion; and
the seal portion is configured such that a notch is formed in an inner side of the seal portion.

3. The vehicle according to claim 1, wherein the seal member is provided along a peripheral edge of the extension portion.

4. The vehicle according to claim 1, wherein:
walls extending in the front-rear direction of the vehicle along the back door glass are configured to erect at a left end and a right end of the extension portion, respectively; and
an upper end of the wall is configured to extend parallel to an inclination direction of the back door glass.

5. The vehicle according to claim 1, wherein:
the seal member is configured to extend in a fin shape; and
the seal member is configured to seal the space between the back door glass and the extension portion.

6. The vehicle according to claim 1, wherein:
the seal member has a cylindrical seal portion and a plurality of insertion portions protruding from the seal portion radially outward of the seal portion; and
the seal member is configured to be attached to the extension portion by inserting each of the insertion portions into a plurality of through-holes formed in the extension portion.

* * * * *